United States Patent [19]

Sy

[11] Patent Number: 4,621,362

[45] Date of Patent: Nov. 4, 1986

[54] ROUTING ARCHITECTURE FOR A MULTI-RING LOCAL AREA NETWORK

[75] Inventor: Kian-Bon K. Sy, Cary, N.C.

[73] Assignee: International Business Machines Corp., Armonk, N.Y.

[21] Appl. No.: 616,742

[22] Filed: Jun. 4, 1984

[51] Int. Cl.⁴ .............................................. H04J 3/00
[52] U.S. Cl. ..................................................... 370/88
[58] Field of Search ...................... 370/88, 89, 14, 99, 370/94; 340/825.05

[56] References Cited

U.S. PATENT DOCUMENTS

| Re. 28,811 | 5/1976 | Pierce | 370/88 |
|---|---|---|---|
| 3,742,144 | 6/1973 | Brandenburg et al. | 370/88 |
| 3,890,471 | 6/1975 | Hachenburg | 370/88 |
| 4,035,770 | 7/1977 | Sarle | 370/88 |
| 4,049,906 | 9/1977 | Hafner et al. | 178/2 C |
| 4,081,612 | 6/1975 | Hafner | 370/60 |
| 4,287,592 | 9/1981 | Paulish et al. | 370/88 |
| 4,390,984 | 6/1983 | Sugiura et al. | 370/88 |
| 4,510,492 | 4/1985 | Mori et al. | 370/88 |
| 4,519,070 | 5/1985 | Bell | 370/88 |
| 4,527,270 | 7/1985 | Sweeton | 370/88 |
| 4,539,679 | 9/1985 | Bux et al. | 370/88 |

OTHER PUBLICATIONS

"Extendability Considerations in the Design of the Distributed Computer System (DCS)", Proceedings, National Telecommunications Conference, Nov. 1973, by D. J. Farber and J. J. Vittal.

Primary Examiner—Douglas W. Olms
Assistant Examiner—Kenneth I. Rokoff
Attorney, Agent, or Firm—Joscelyn G. Cockburn

[57] ABSTRACT

The architecture provides a frame format and procedure for routing messages through a single ring or multi-ring communication system. Stations associated with the exchange of messages are located on the single ring or on different rings of the multi-ring communication system. The rings are connected by bridges to form a local area network. The frame format includes a plurality of control bits positioned within a Routing Information (RI) field, a frame control field and a frame status field. Messages are generated and structured in accordance with the frame format. A group of the control bits, in each message, is set with initial values according to the message type. Thus, different messages are characterized by a different sequence of control bit settings. A routing algorithm analyzes the message and depending on the status of the control bits, the message is processed and ultimately switched to its proper destination.

20 Claims, 13 Drawing Figures

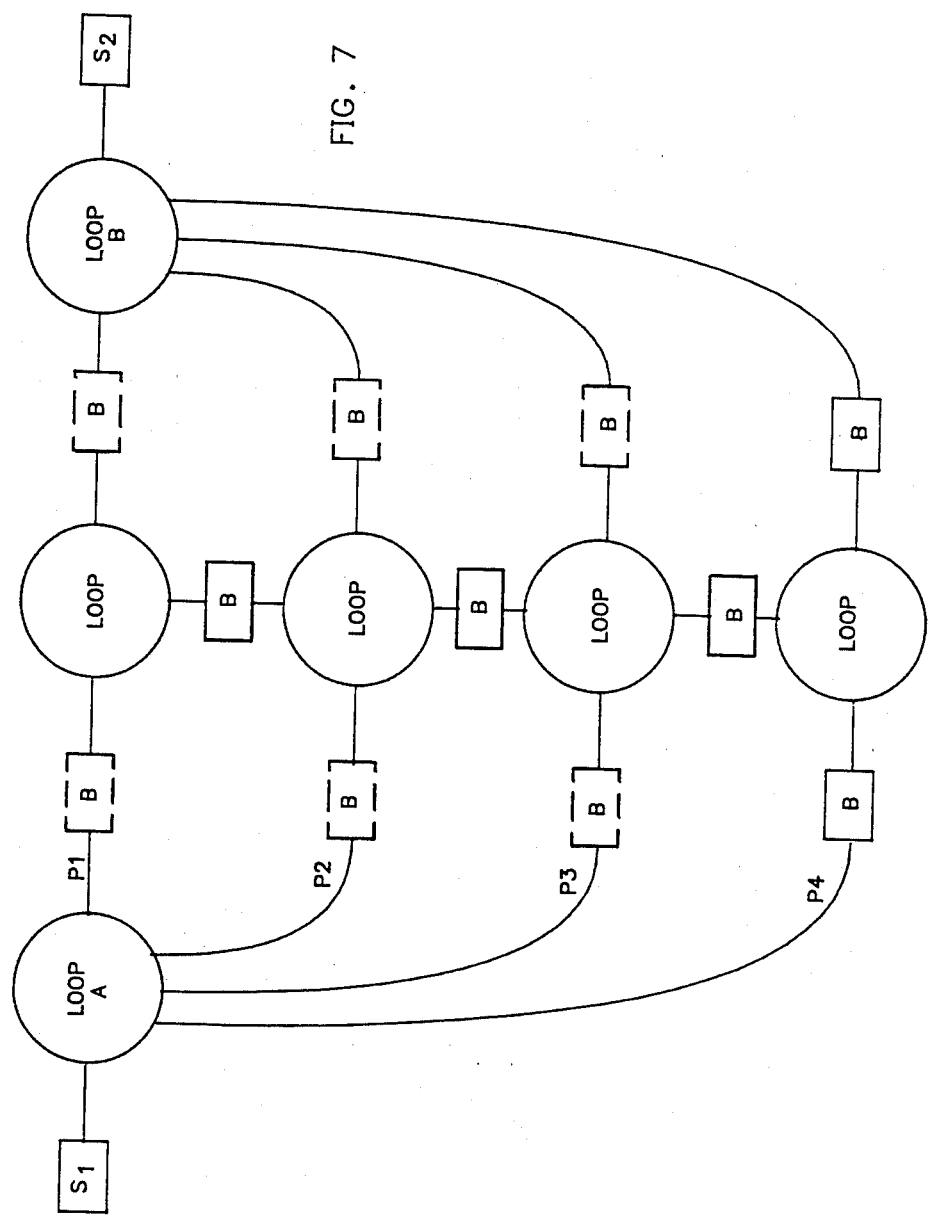

ROUTING ARCHITECTURE FOR A MULTI-RING LOCAL AREA NETWORK

BACKGROUND OF THE INVENTION

Cross-Reference to Related Application

The present application relates to application Ser. No. 616,754, filed 6/4/84, by K. K. Sy, and entitled "Routing Mechanism with Encapsulated FCS for a Multi-Ring Local Area Network."

1. Field of the Invention

The present invention relates to communication systems in general and more particularly to ring or serial loop data communication systems.

2. Prior Art

In the past, several types of digital transmission arrangements have been proposed or used for transmitting data between a plurality of data sources. The single ring or serial loop configuration is one of the prior art arrangements. Essentially, this type of communication system includes a communication channel formed into a loop. One or more data sources are connected to adapters and the adapters are connected to the communication channel or wire. The adapters are arranged serially about the periphery of the loop. The configuration is such that data flows from a data source through its associated source adapter and serially through one or more intervening adapters. When the data reaches the target adapter, it is extracted from the loop and is subsequently forwarded to the target data source. If there are no intervening adapters, the data flows directly from the initiating data source/adapter through the loop and into the target data source/adapter. A more detailed description of single loop configurations is given in U.S. Pat. No. 3,890,471, issued to Victor Hachenburg on June 17, 1975. The copending patent application, Ser. No. 326,291, filed on Dec. 1, 1981, by P. A. Janson et al, entitled "Method of Transmitting Information Between Stations Attached to a Unidirectional Transmission Ring," and Ser. No. 463,470, filed on Feb. 3, 1983, by Tucker et al, entitled "Protocol for Determining Physical Order of Active Stations on a Token Ring," describes techniques for managing a single loop communication network. Both pending applications are assigned to the assignee of the present invention.

Another prior art configuration is the multi-loop or multi-ring arrangement. The multi-loop arrangement is best suited for an installation where a large number of data sources are to be connected. It is believed that the multring configuration is more efficient than the single loop for handling a large number of data sources. The multi-loop arrangement consists of a plurality of independent single ring communication network interconnected to one another by one or more switching stations called bridges. Any data source or terminal on one ring may transfer messages to another terminal on the same or different rings. The switching of messages between rings is provided by the switching stations (bridges) which interconnect the rings.

U.S. Pat. No. RE28,811 (Ser. No. 410,813, filed Oct. 29, 1973, issued on May 11, 1976 to John Robinson Pierce) is an example of the prior art multi-loop communication system. In the patent a plurality of independent rings are interconnected, by switching stations, to form a single network. Messages are conveyed between stations by standardized message blocks. Each message block includes one or more address fields located at the head or beginning of each block. The switching stations use the contents of the address field for switching the messages between rings. A difference criterion is used for switching the message. Essentially, the switching station detects a destination code which is carried in the address field. The detected destination code is then compared with the code for the loop on which the message block is currently circulating. If the codes are different, the message block is switched to another interconnecting loop. The process continues until a match is obtained. This technique does not ensure that the message will traverse the optimum (i.e., shortest) path between source and destination.

U.S. Pat. No. 3,742,144 (Ser. No. 201,744 filed Nov. 24, 1971) describes another technique for routing messages in a digital multi-loop communication network. A Hamming distance criterion is used as the basis for switching messages between the loops.

U.S. Pat. No. 4,081,612 (Ser. No. 705,251 filed July 14, 1976, foreign priority Switzerland July 31, 1974) describes a technique for building up a routing address between stations interconnected by bearer channels and switching nodes.

U.S. Pat. No. 4,049,906 (Ser. No. 679,074 filed Apr. 21, 1976, foreign priority Switzerland Apr. 25, 1975) describes an apparatus for forwarding messages through the switching stations of a digital network with plural switching stations.

Still other prior art techniques for routing messages in multi-ring networks are described by D. J. Farber and J. J. Vittal in an article entitled, "Extendability Considerations in the Design of the Distributed Computer System (DCS)," Proceedings, National Telecommunications Conference, November, 1973.

SUMMARY OF THE INVENTION

It is therefore the general object of the present invention to provide a more efficient apparatus and technique for switching messages through the subnetworks of a multi-ring network.

It is another object of the present invention to use a more efficient criterion as the basis for switching messages.

To this end, the invention provides a unique frame format for the transport unit that carries messages in the network. At each "Bridge" or interconnecting station a programmed microprocessor interrogates the transport unit and depending of the setting of the control bits, the message is discarded or routed to its destination.

In particular, the transport unit includes a control bit "U" positioned in the PCF1 (Physical Control Field 1) byte, an RI (Routing Information) field and two control bits designated as "L" positioned in the E-DEL (Ending Delimiter) byte. The "U" bit is the routing indicator and signifies the presence of an RI field. Likewise, the "L" bit is the last bridge indicator and signifies when the message passes through the last bridge. Doubling of the "L" bit ensures that a bridge will not discard a valid frame.

The RI field further includes an address section and a control section. The address section contains the identification numbers for the bridges through which the message should be routed. Preferably, the identification number is provided by the station that initiates the message.

The control section of the RI field further includes a plurality of control bits which are used in conjunction with the previously mentioned "U" and "L" bits to facilitate routing and control of the message. The control section contains a B (Broadcast) bit, an LB (Limited Broadcast) bit and a D (Directional) bit. An "R" signifies reserve bits.

In addition, the control section contains two sets of bits. One set represents a Length (LTH) field and carries a value representative of the number of bytes in the RI field. The other set represents a Pointer (PTR) field and carries a value which indicates (to a bridge) the identity of the next bridge that must process or switch the message.

A sending station generates and forwards a message in accordance with the above format. All of the above identified bits are initialized (set and/or reset) by the sending station. At each bridge the frame is analyzed in accordance with a predetermined algorithm. If the "U" bit is set, the frame is received and is analyzed to determine whether or not the frame should be forwarded or discarded. Frames that are copied are sent via a path identified by consecutive bridge numbers in the RI field. The value in the (PTR) field identifies the next bridge through which the frame will be transmitted to its ultimate destination. As the frame passes through the bridge, the PTR is adjusted (incremented or decremented) to identify the next bridge. When the frame arrives at the last bridge in the chain or sequence, the message is directed to the appropriate node where the message is extracted by a recipient station.

In order to send a "response" or message to the initiating station, the recipient station changes the "D" control bit to its opposite state and changes the value of the PTR. Preferably, if D=0 the PTR is set to identify the first bridge of the sequence. Alternately, if D=1, the PTR is set to identify the last bridge of the sequence.

Thus, a common frame format is provided for shuttling messages through the multi-ring network. The relative positions of the bridge identification numbers, in the Routing Information field (RI field), give the sequence or order of the bridges through which the message will pass and the PTR gives the next bridge that will process the frame.

To this end, when a message is being transmitted from a sending station to a recipient station, the bridges are traversed in a first direction relative to the order in which the identification numbers of the bridges are recorded in the RI field. For response messages the bridges are being accessed in the opposite direction. The order in which the bridges are being accessed is determined by the value of the (PTR) field.

In one feature of the invention a modified frame format is used to transmit broadcast messages. In the modified format, the space designated for recording the bridge identification number is omitted. As a result of the omission the control (C) section of the RI (Routing Information) field is concatenated with the Information Field. A station wishing to establish a logical link with another station issues the "Broadcast Frame" with the PTR being set to logical "0" and the length (LTH) field being set to an initial value.

As the broadcast frame moves through the network toward its destination, each bridge that the frame passes through inserts its identifcation (ID) number between the control section of the RI field and the Information Field on the boundary identified by the incoming value of the LTH field. The LTH field is then incremented and the next bridge inserts its ID number and increments the value of the LTH field. The process (i.e., inserting bridge numbers and incrementing the LTH field value) continues until the frame is delivered to the target station. The accumulated string of ID numbers defines the bridges through which future messages will be routed. It should be noted that in using the broadcast frame only the LTH field and the address space designated to carry the bridges ID numbers are adjusted. All other fields remain constant.

The target station then issues a non-broadcast message or a response to the previously described broadcast message using the aforementioned string of bridge IDs as the routing path. The technique is used to identify the lcoation of a station and a route through which messages can be sent.

Another feature of the invention provides the limited broadcast (LB) function. This function allows a target station to receive a single copy of a broadcast message even though the initiating station and the target station are interconnected by a plurality of paths. The function is activated when both the broadcast (B) bit and the (LB) bit are set to logical "1." A broadcast frame will be forwarded by only those bridges designated to forward limited broadcast frames.

The foregoing features and advantages of the invention will be more fully described in the accompanying drawings.

BRIEF DESCRIPTION OF THE DRAWINGS

FIG. 7 represents a complex multi-loop network in which selected bridges are programmed not to forward limited broadcast frames.

DETAILED DESCRIPTION OF THE PREFERRED EMBODIMENT

Before giving a detailed description of the drawings, it should be noted that there are many options for configuring rings into a multi-ring network using bridges as the interconnecting device. The FIGS. 1A-1E merely illustrate rings connected by bridges and should not be construed as a limitation on the scope of the present invention. The present invention is intended to route messages through any network comprising of a plurality of rings coupled into a single local area network by bridges. The topology of the network is of no moment to the present invention. The showing therefore is merely illustrative of the type of complex network within which the invention can be adapted.

Figure 1A:
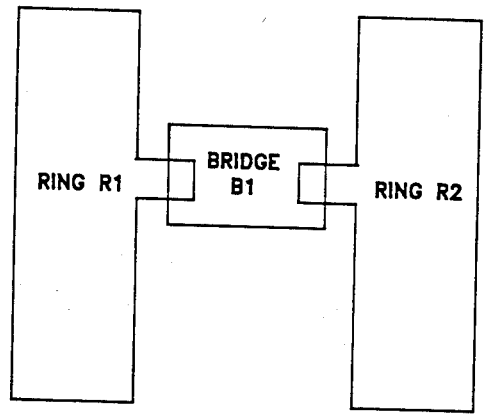
FIGS. 1A-1E show a plurality of schematics representing different types of multi-ring networks, each one being capable of embodying the present invention.

Referring now to FIGS. 1A-1E, there is shown a graphical representation of rings connected by one or more bridges. More particularly, FIG. 1A shows two rings, ring R1 and ring R2, connected by bridge B1.

Figure 1B:
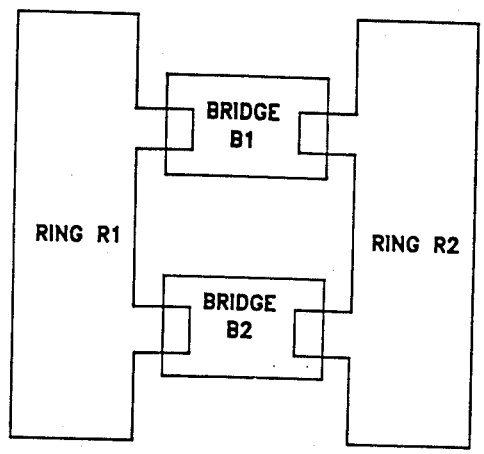

FIG. 1B shows two rings R1 and R2 connected by parallel bridges B1 and B2.

Figure 1C:
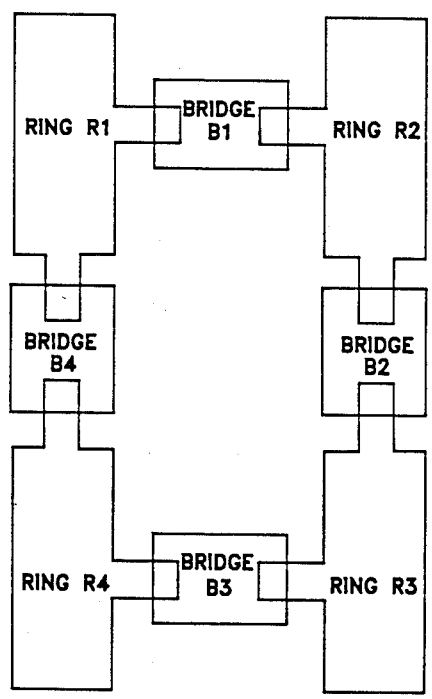

FIG. 1C shows a complex network consisting of four rings identified as R1, R2, R3 and R4 connected by four bridges B1, B2, B3 and B4. The combination of bridges and rings forms a loop.

Figure 1D:
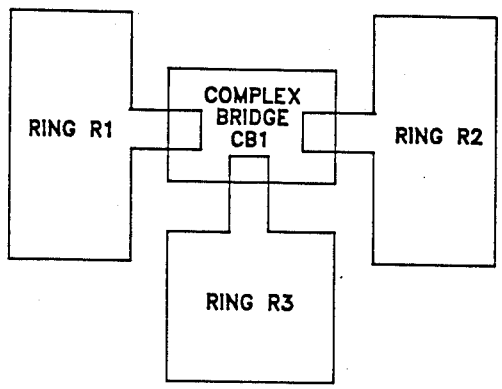

FIG. 1D shows a topology in which a complex bridge CB1, interconnects a plurality of rings R1, R2 and R3. A complex bridge is defined as that bridge which connects three or more rings. On the other hand, a simple bridge is one that interconnects two rings.

Figure 1E:
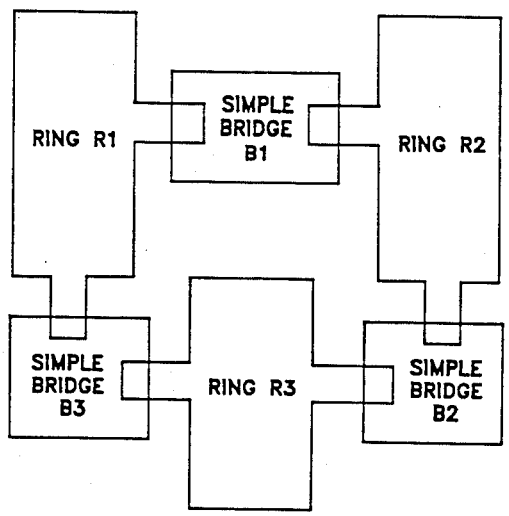

FIG. 1E shows a simple bridge B1, B2 and B3 interconnecting rings R1, R2 and R3. As stated above, the present invention is intended to be used in any type of multi-ring network.

Figure 2:
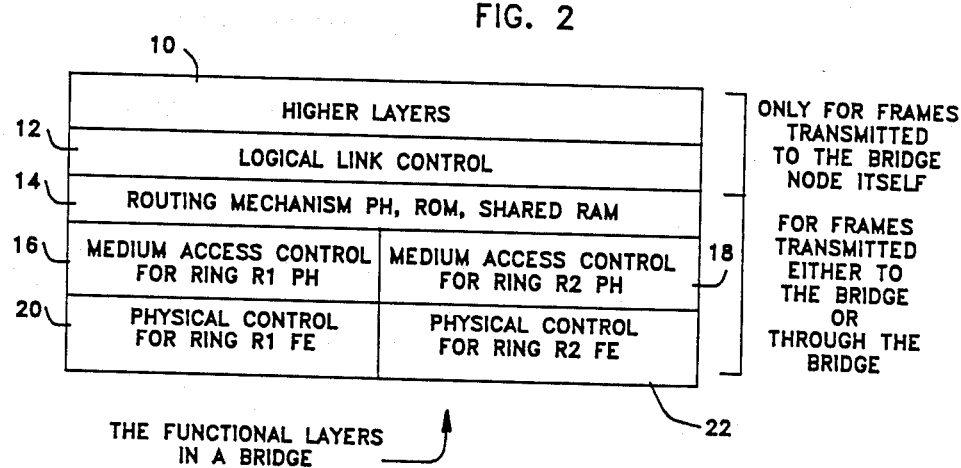
FIG. 2 is a schematic showing the logical structure of a bridge.

FIG. 2 is a schematic illustrating the logical structure of the bridge. Preferably, the bridge is configured into a layered structure with the rings connected to the physical control layer. FIG. 2 represents a simple bridge capable of supporting two rings R1 and R2. The upper layers identified by numerals 10 and 12 are used to process frames transmitted to the bridge node itself. While the lower layers identified by numerals 14, 16, 18, 20, and 22 are used to process frames transmitted either to the bridge node (not shown) or through the bridge. As stated above, the bridge is the device that interconnects rings and routes messages from one ring to the next. Layers above the routing mechanism layer 14 need not be implemented if an end-user node is not connected to the bridge.

The operation of the bridge can be expressed in terms of the Local Area Network (LAN) model defined in IEEE 802.5 (Institute of Electrical and Electronics Engineers, Inc., Draft IEEE Standard 802.5, Token Ring Access Method and Physical Layer Specification, Dec. 1, 1983), as a Medium Access Control (MAC) level relay station. Essentially, logic link control procedures are implemented between pairs of source and destination stations, and not terminated, examined or affected by intervening bridges. The subject draft standard is incorporated herein by reference and can be referred to for a more detailed description.

In the preferred embodiment of this invention routing occurs in the medium access control layer of the bridge. As such messages are not terminated, examined or affected by intervening bridges.

It is worthwhile noting that the alternative to routing in the medium access control layer would be to terminate all logical links in the bridge, and perform routing at the layer above logical link control. This alternative approach imposes a greater processing burden on each bridge, with little observable benefit. The similar transmission characteristics of the separate token rings make separate, different logical link controls unnecesary. In addition, the single address space of all stations in the network of token rings, coupled with the identical frame format in each ring, allows frames to flow through bridges largely unmodified and less prone to error. Finally, the multiple access nature of the local area network diminishes the need for multiplexing higher level, transport-like connections into single logical links or between bridges.

Figure 3:
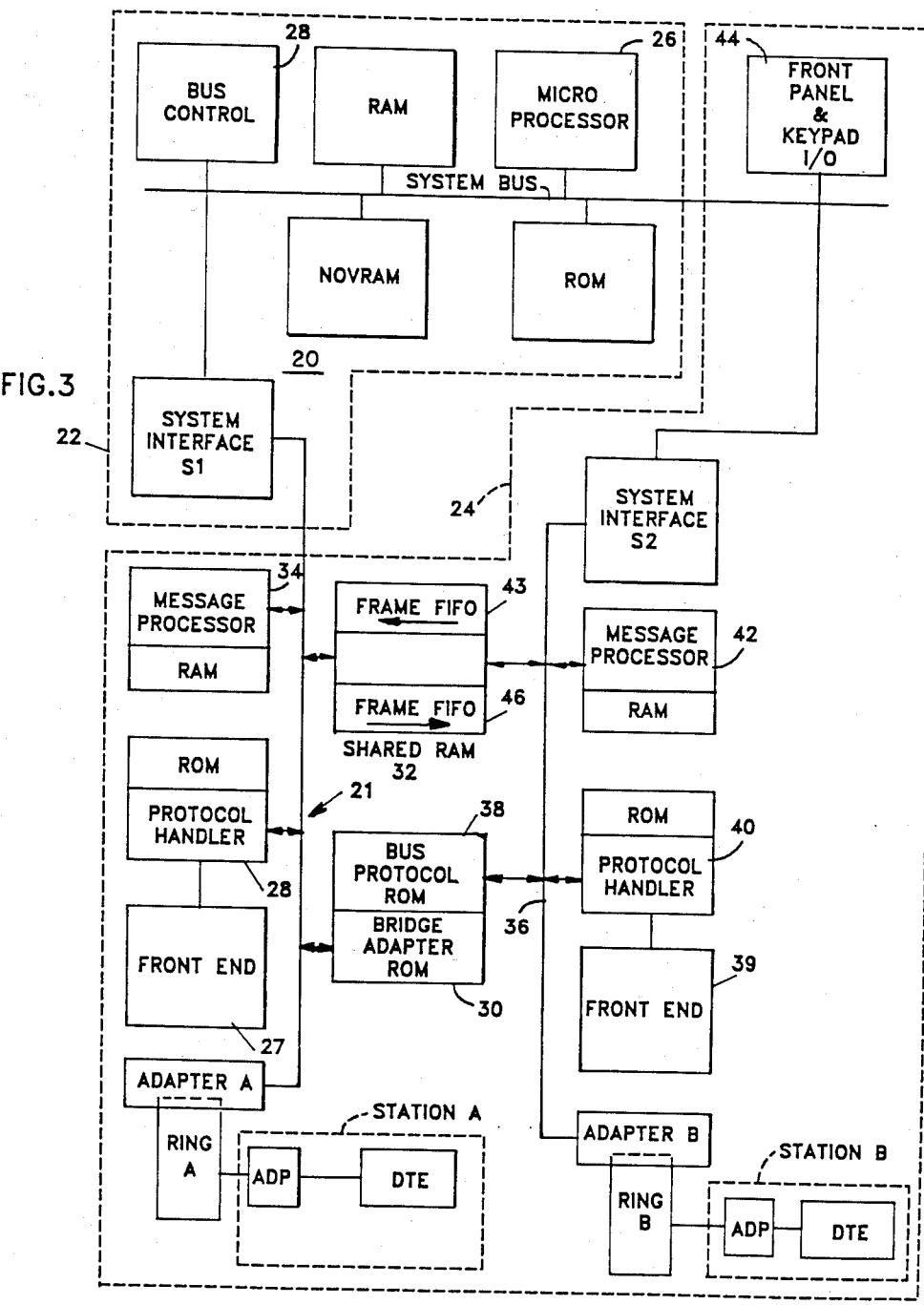
FIG. 3 is a schematic showing a hardware implementation for a bridge.

FIG. 3 shows a block diagram for a hardware embodiment of the logical bridge structure shown in FIG. 2. The portion of the bridge which is enclosed by broken lines 22 is used to process messages directed to a node (not shown) connected to the bridge. The present invention primarily relates to the section of the bridge enclosed by broken lines 24. Since the present invention is primarily concerned with the portion of the bridge which routes messages, only the elements in section 20 which are necessary to the understanding of the present invention will be described. To this end, system interface S1 is connected to local multiplexor bus 21. The function of the system interface is to accept messages which are routed through the bridge to a station connected thereto. The system interface accepts the message from multiplexor bus 21, performs certain functions on the message, and sends it upward to microprocessor 26. The microprocessor with its non-volatile RAM (NOVRAM) and ROM is coupled through appropriate connectors to a system bus and the system bus is controlled by bus control unit 28.

Still referring to FIG. 3, the bridge comprises of Bridge Adapters A and B, respectively. Adapter A is interconnected to ring A while adapter B is interconnected to ring B. Each ring carries a plurality of stations. In FIG. 3, only one station identified as station A is coupled to ring A and station B is coupled to ring B. Each station comprises of a device adapter (ADP) and a data terminal equipment DTE connected to the device adapter. Information onto the ring is generated in the data terminal equipment and flows through the device adapter onto the ring. Likewise, data is extracted from the ring by the device adapter and into the data terminal equipment. Such configurations are well known in the art and a detailed description will not be given. Suffice it to say that the DTE further includes a frame code signal generating means adapted to generate a frame according to the teachings of the present invention. In the preferred embodiment of the present invention, the frame code generating means is a programmed microcomputer of the type described in the above-referenced patent application by Tucker et al, Ser. No. 463,470. The referenced patent application is incorporated herein by reference.

The Bridge Adapter A is connected to multiplexor bus 21. The multiplexor bus is also connected to protocol handler (PH) 28, bridge adapter ROM 30, shared RAM 32, and message processor (MP) 34. A front end module 27 is connected to protocol handler 28.

Likewise, adapter B is connected to local multiplexor bus 36. The multiplexor bus 36 is connected to bus protocol ROM 38, protocol handler (PH) 40, and message processor (MP) 42. Front end module 39 is connected to the protocol handler. A front panel and the keypad I/0 means 44 is connected through system interface S2 to local multiplexor bus 36. The front panel and keypad I/0 means 44 is used to enter information into the bridge and to display operating information relative to the bridge. Likewise, the function of the bus protocol ROM is to store permanent information relative to the control of the bus. The bridge adapter ROM stores permanent information to control the adapters. The front end modules contain circuitry for generating and handling signals in the bridge. For example, the crystal and clocking circuits (not shown) are preferably located in the front end modules. The protocol handlers with associated ROM handle the protocol which is used to enable a bridge to gain access to the network. The message processors contain the algorithms (to be described later) that process the frames which are routed through the bridge.

Still referring to FIG. 3, the bridge adapters A and B contain the circuitry necessary to transmit data onto and to receive data from the ring. The adapter contains sufficient memory for buffering both outgoing and incoming frames. The bridge adapters further contain DMA (Direct Memory Access) channels (not shown) which control the transfer of frames between the shared RAM 32 and the transmission medium of the ring. The adapters further contain a microprocessor (not shown) whose major tasks are to manage frame buffers, set up the DMA channels and control the interface to the message processor. The shared RAM 32 is an 8k byte static RAM capable of interfacing with local buses 21 and 36, respectively. Preferably, the clock phases of the two local buses will be 180° out of phase and the data fed to the shared RAM from the local buses is interleaved cycle by cycle. To this end, frames which are directed from ring B to ring A are stored into the section of the RAM identified by numeral 43 and are then fed out in a first-in, first-out fashion. Similarly, frames which are directed from ring A to ring B are stored in the section of the RAM designated by numeral 46 and is fed out in a first-in, first-out manner to local multiplexor bus 36. In the preferred embodiment, the size of the shared buffer is 8k.

Figure 4:
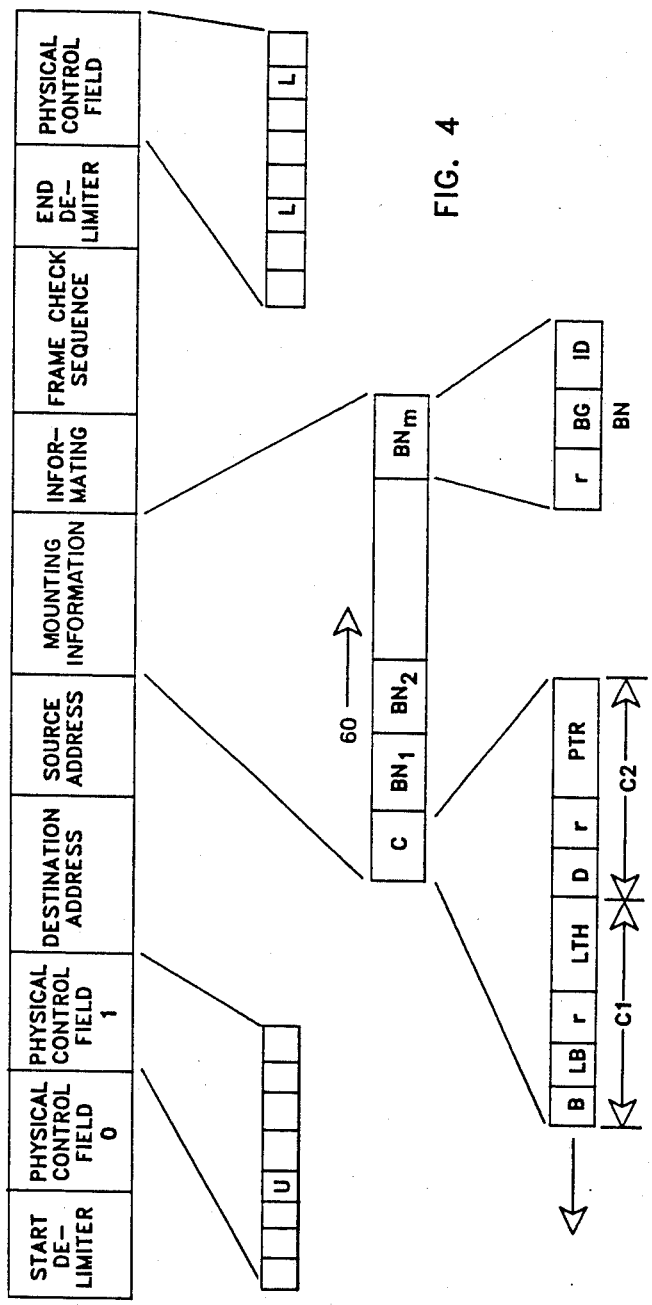
FIG. 4 shows the frame format according to the teaching of the present invention.

FIG. 4 shows a novel frame format according to the teaching of the present invention. The format is used for routing messages throughout the multi-ring network. The format comprises of a starting delimiter (SD) field, a physical control field (PCF), a destination address (DA) field, a source address (SA) field, a routing information (RI) field, an information (INFO) field, a frame check sequence (FCS) field, an ending delimiter (EDEL) field, and a physical control (PCF-E) field. Except for the RI field and certain bits in the physical controlled fields the other fields in the format are substantially the same as described in the draft IEEE standard 802.5, Token Ring Access Method and Physical Specification, Dec. 1, 1983. This document is incorporated herein by reference and can be referred to for a detailed description of the enunciated fields.

Still referring to FIG. 4, Bit 3 (the fourth most significant bit) of the physical control field (PCF-1) is defined as the routing bit (U) indicated. When this bit is set to a predetermined value by the transmitter of a frame, an RI field is included in the frame. If the bit is not set to the predetermined value, then there is no RI field and a bridge will not process the information. In the preferred embodiment of this invention, the routing field indicator bit (U) is set to logical "1". A transmitter can optionally omit the RI field in frames that will never leave the ring. This allows stations that are designed to operate on only a single ring (limited station) to co-exist with stations that support the RI field for multi-ring operation. For multi-ring operation the limited station only examines the "U" bit and discards frames in which the "U" bit is set.

Still referring to FIG. 4, an expanded graphical representation of the PCF-E field is shown. The PCF-E field is one byte long and bit 2 (the third most significant bit) and bit 6 (the seventh most significant bit) are defined as the last bridge (L) indicator. The purpose of the L bits is to detect circulating non-broadcast frames. These bits are set to a first value by a source station, and it shall be set to a second value by the last bridge along the path prior to forwarding the frame to the target ring. Once these bits are set by the last bridge, no other bridges in the network will forward the frame. In the preferred embodiment of this invention, the L bits are set to logical zero by the source station. Likewise, the last bridge sets the bits to a logical "1."

It should be noted that a single "L" bit is permissible. However, doubling the L bit provides error checking capabilities. It is therefore assumed that a "0" in either position constitutes L="0." Likewise, both L bits must be "1" to constitute L=1. If the two positions differ, then a bit error has occurred. Additional forwarding will occur only if looping is allowed. The last bridge is then likely to catch the frame the next time around. It is preferred to have an additional pass around a loop rather than the discarding of a valid frame, requiring retransmission by logical link control.

FIG. 4 shows the expanded structure for the RI field. The RI field is optional if the frame does not leave the ring. The RI field is mandatory if the frame leaves the ring. When the field is present, it has a variable length with a 2-octet routing control field (C) and up to m 2-octet bridge number fields; where m is limited by the length of one of the subfields within the routing control field. As will be explained subsequently, the bridge number fields identify the bridges through which a message is routed. The bridge numbered field is placed in the appropriate location by the source station. However, if a source station does not know the location of a particular target station, the bridge number field is left blank and as the message progresses through individual bridges towards the target station, each bridge that the message traverses enters its bridge number in the RI field. Thus, this unique message format can be used for delivering messages and it can be used to acquire the routing information through which the message must be routed. When the frame is used to acquire routing information, the pointer is adjusted as the frame passes through the bridge.

Still referring to FIG. 4, the control field (C) is 2 bytes or octets in length. The C1 byte contains a broadcast (B) bit, a Limited Broadcast (LB) bit, and a length (LTH) field. Likewise, the C2 byte contains a directional (D) indicator and a pointer (PTR). In the preferred embodiment of the invention the LTH Field and PTR field are five (5) bits.

The function of these bits is as follows:

Broadcast (B): This bit, when set to a predetermined value, indicates that the frame is destined for all rings. It does not imply that the frame is destined for all stations on all rings. In the preferred embodiment of this invention, the predetermined value is logical "1".

Limited Broadcast (LB): This bit (i.e., the LB bit) is used in conjunction with the B bit. The limited broadcast bit indicates to a bridge that this is a limited broadcast frame. The bit is set when there is a requirement for the stations to receive only a single copy of broadcast frames. Limited Broadcast requires a path to be identified such that broadcast frames can reach to all stations from any station in the network. Bridges that are configured not to process Limited Broadcast will discard the frame. The decision to reject Limited Broadcast frames is set when a bridge is initialized. As was stated previously, information can be entered into the bridge from the front panel and keypad I/0 means (FIG. 3).

Length (LTH): This field has a predetermined number of bits and is used to indicate the length of the RI field in bytes. For a broadcast frame, this field is set to 2 by the transmitting station. When the frame is forwarded, this field is incremented by 2. For a non-broadcast frame, this field is used to indicate the length of the RI field and remains unchanged when the frame travels through the sub-network.

As stated before, for a broadcast frame the length field is initialized at 2 by the transmitting station and is incremented by 2 by every bridge that forwards the frame and places its identification number in a new bridge number field. The length of the RI field also furnishes a basis for comparison with a bridge's hopcount, where it reflects a number of hops (LTH-2)/2, that a frame has taken so far. For a non-broadcast frame already carrying routing information, the field indicates the length of the RI field, and remains unchanged as the frame traverses the network. In the preferred embodiment of this invention 5 bits are allotted for the length field. This allows the number of bridges m in a route to be as high as 14.

Direction (D): This bit indicates to a bridge whether to increment or decrement the pointer (PTR), to be described below, when it forwards a frame. In the preferred embodiment of this invention, if D=0, the pointer is incremented by 2: otherwise, it is decremented by 2. Basically, the direction bit indicates whether the frame is traveling from the originating station (that sent the message) to the target or the other way around (i.e., from the target station to the originating station). Its use allows the list of bridges in the RI field to appear in the same order for frames traveling in both directions along the route. Thus, the directional bit allows a common frame to shuttle information bidirectionally between a message originator and its target without changing the order of the bridge numbers in the RI Field. The D bit is never changed in transit. For broadcast frames, the transmitting station sets a D=0. Bridges do not need the D bit in broadcast frames, but receivers could uniformly complement the received D bit when they gleam routing information from frames with RI fields. Thus, for non-broadcast frames transmitted to the target, the originator of the "Resolve" normally sets D=0. The target of the Resolve frame c to be described subsequently sets D=1 in all response frames to the originator. The Resolve and Resolve response provides the originator with a bridge number vector, D-bit value, and length value which can then be transmitted to the target in the RI field of a non-broadcast frame. Both stations may store the values in their RI fields for use in all frames subsequently transmitted to each other.

Pointer (PTR) or next bridge pointer (NBP): This 5-bit field points to a particular place in the RI field of non-broadcast frames where the number of the next bridge designated to forward the frame is stored. The pointer value is an offset in octets (bytes) from the beginning of the RI field. Since the length field is sufficient in broadcast frames to inform a bridge where to insert its bridge number, the next bridge pointer is optional in broadcast frames. If it is decided not to use these bits for broadcast frames, then their values are reserved (r).

In a non-broadcast frame, the initial setting of the pointer field by a source station depends on the value of the D bit. If D=0, the pointer is set to 2 (thus indicating the first bridge number in the list, while if D=1, the pointer is set to (LTH-2), the last bridge number in the list). The last bridge always returns a pointer to its original value, so that the source to destination frame check sequence can be used to check for errors. The use of the D bit and pointer field is summarized in the table below.

|  | DIRECTION BIT | |
| --- | --- | --- |
|  | D = 0 | D = 1 |
| Initial PTR Value | 2 | LTH−2 |
| Indication of First Bridge | PTR = 2 | PTR = LTH−2 |
| Indication of Last Bridge | PTR = LTH−2 | PTR = 2 |
| Not Last Bridge Action | PTR = PTR+2 | PTR = PTR−2 |
| Last Bridge Action | PTR = 2 | PTR = LTH−2 |

It is worthwhile noting that the values assigned to the D Bit are merely exemplary and can be changed without departing from the scope and spirit of the present invention.

Still referring to FIG. 4, the structure for the bridge number (BN) field is shown. In the preferred embodiment of this invention each bridge number (BN) field is 2 octets long. The first two bits are reserved (r) for future use while the remaining 14 bits are divided into two sub-fields of lengths K and (14-K), respectively. The sub-field of K length is called the bridge group (BG) portion of the bridge number. While the sub-field of (14-K) length is called the individual bridge portion of the bridge number. The bridge number (ID) is unique to each bridge in the network and is assigned during an initialization procedure.

The sub-division of the bridge number allows parallel bridges to exist and share traffic between the same two rings. When parallel bridges are used between two rings, the parallel bridges share the same bridge group portion of the respective bridge numbers, and differ in only the individual bridge portion. A parallel bridge examines only the bridge group portion of the bridge numbers in the RI field of the broadcast frame to determine if its number is already in the list of bridges. If its bridge group portion matches a bridge group portion in the list, it will not forward the frame. By not forwarding frames that have already been forwarded by a bridge with the same bridge group number, the bridge prevents broadcast frames from ricocheting between two rings connected by parallel bridges. Complete bridge numbers are still inserted into broadcast frames and examined in non-broadcast frames.

This concludes the description of the frame format. Having described the unique frame format which is used as a transportation vehicle within the network, the algorithms which are provided at each bridge to analyze the frame will now be described.

As stated previously, before a frame is transmitted, an initiating station sets certain control bits within the frame. For a broadcast frame, D bit is always set to 0. For a non-broadcast frame, the setting of D bit depends on the relative position of the BN. If the BN identifies a route (in a forward direction) from a source station to a targeted station, the D bit will be set to a logical "0." If the BN identifies a route in the reverse direction, then D bit will be set to a logical "1."

Turning to FIG. 4 for a moment, the forward direction is shown by arrow 60. When a message is moving in the forward direction, it is leaving an initiating station and the first bridge to process the message is $BN_1$, followed by $BN_2$ and so on. Likewise, if the message is moving in the opposite direction 61, the first bridge to process the message is $BN_m$ followed by the bridges with lower bridge numbers.

Setting of the PTR by the transmitting station depends on the D bit. If D=0, the PTR will be set to 2. If D=1, PTR will be set to LTH-2.

Prior to forwarding a frame, a bridge needs to update the pointer. This again depends on the D bit. If D=0, the pointer is incremented by 2. If D=1, pointer is decremented by 2.

It should be noted that the combination of D bit and the pointer indicates to a bridge its relative position with respect to a given route. If D=0 and PTR=2, this indicates to a bridge that the frame is leaving the source ring. If D=0 and PTR=LTH-2, this indicates to a bridge that the frame will be forwarded to the target ring. D=1 and PTR=LTH-2 indicates to a bridge that the frame is leaving the source ring. D=1 and PTR=2 indicates to a bridge that the frame will be forwarded to the target ring.

With the aforementioned described setting, when a bridge sees a frame, a decision has to be made whether or not to forward the frame.

Figure 5:
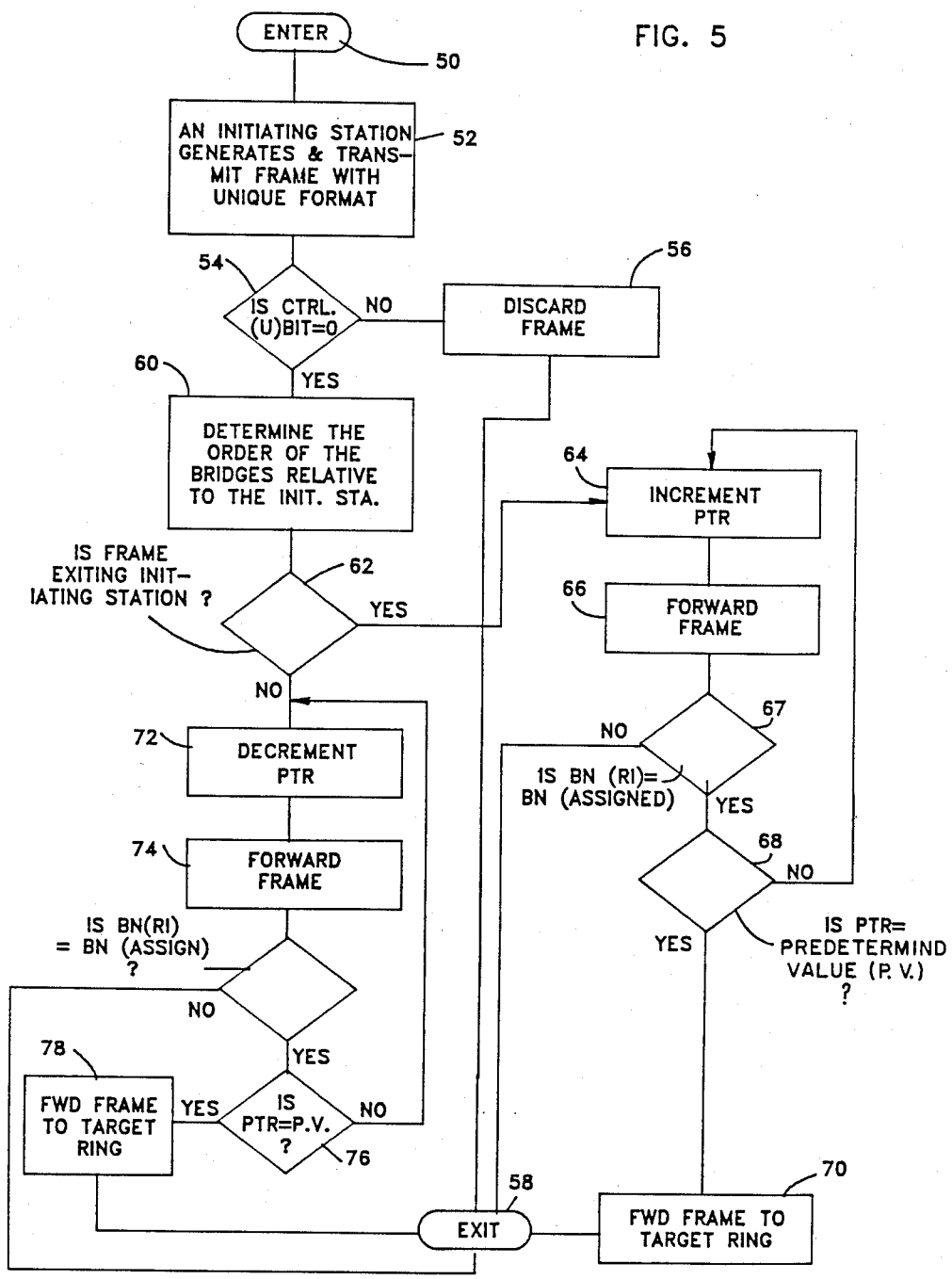
FIG. 5 shows a macro flow chart of an algorithm for analyzing and processing the frame.

FIG. 5 shows an algorithm which describes a series of macro steps for processing a frame generated according to the above-described format and carries a message from a source station through a plurality of bridges to a target station. In order to simplify the description, each geometrical block represents a process step and is identified by a numeral followed by a description of the process step.

Block 50: This is the first step in the process and signifies the entry point into the routine. From block 50 the program descends to block 52. In block 52 the initiating station generates a message in accordance with the above described frame format, sets some bits in the message and then forwards the message.

Block 54: In block 54 the program tests the "U" bit. If the U bit equals "0," the program discards the frame (block 56) and exits the routine through block 58.

Block 60: In block 60 the program determines the order of the bridges relative to the initiating station. Stated another way, the program determines its position relative to the other bridges enunciated in the routing field. Several steps are necessary for a station to determine its position and each of these steps is subsequently described in more detailed flow charts.

Block 62: In block 62 the program tests to see if the frame is exiting from an initiating station. If it is, the program then enters block 64 where it increments the pointer and retransmits (forwards) the message (block 66). The receiving station, blocks 67 and 68, test to see if the bridge number $B_n$ in the RI field is equal to the bridge number assigned to the bridge and if the pointer is set to a predetermined value (P.V.). If the pointer is not equal to the predetermined value the program goes into a loop and the process steps 64–68 are performed until the pointer value equals the predetermined value. Once this value is reached, the program forwards the frame to the target ring (block 70) and then exits the program at block 58.

If the frame is not exiting from an initiating station, the program descends into block 72 and decrements the pointer (PTR). From block 72 the program descends into block 74 where the frame is retransmitted. A receiving station (blocks 75, 76) checks to see if the bridge number $B_n$ in the RI field is equal to the bridge number assigned to the bridge and if the pointer is equal to a predetermined value. If the pointer is not, the program enters into a loop and the process continues until the pointer is equal to the predetermined value and the bridge number matches. Once the predetermined value is reached, the program enters block 78 where the frame is forwarded to the target ring and the program exits the frame through block 58.

Figure 6A:
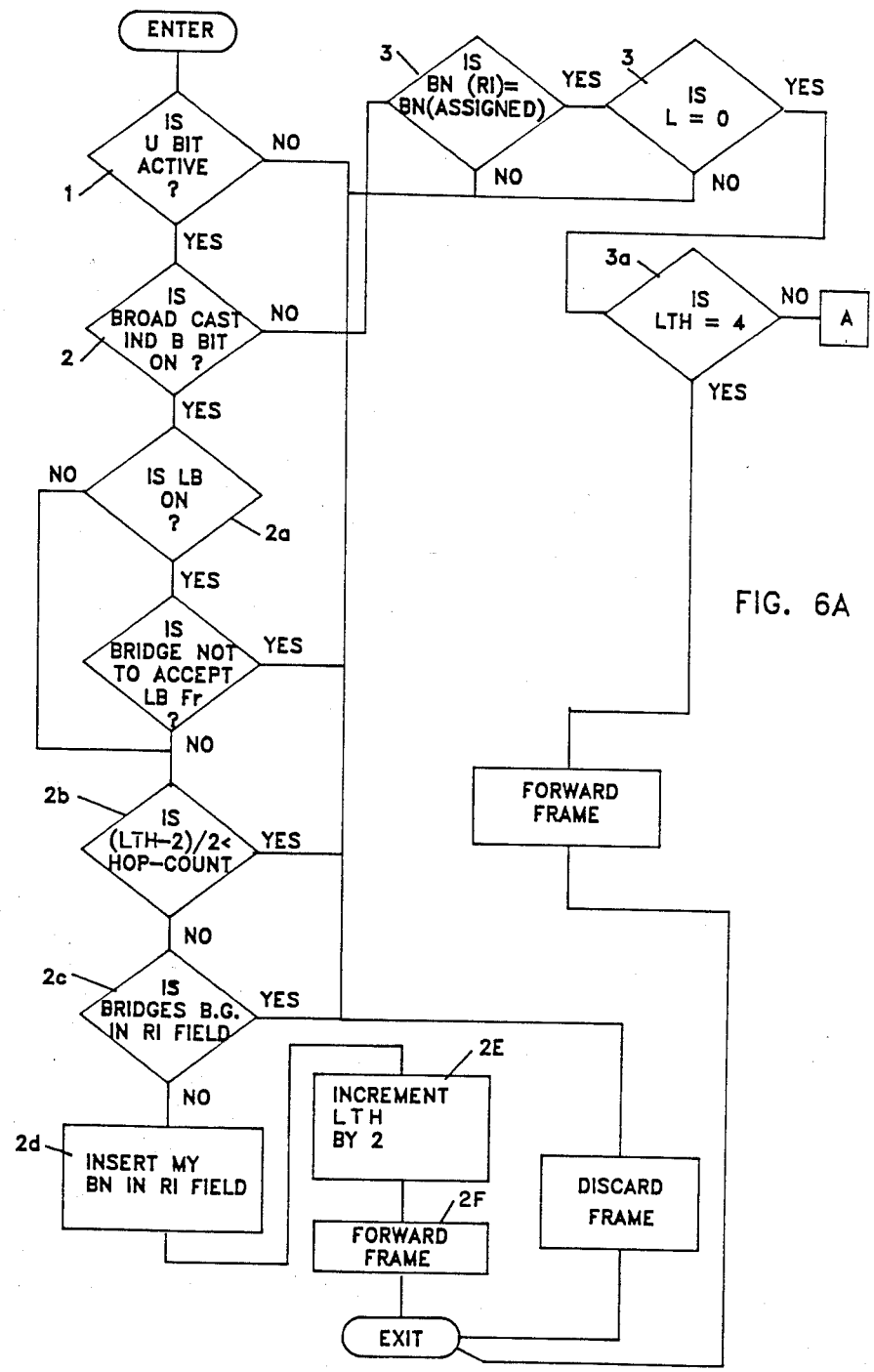
FIGS. 6A-6B show more detailed algorithms for analyzing and processing the frame.
Figure 6B:
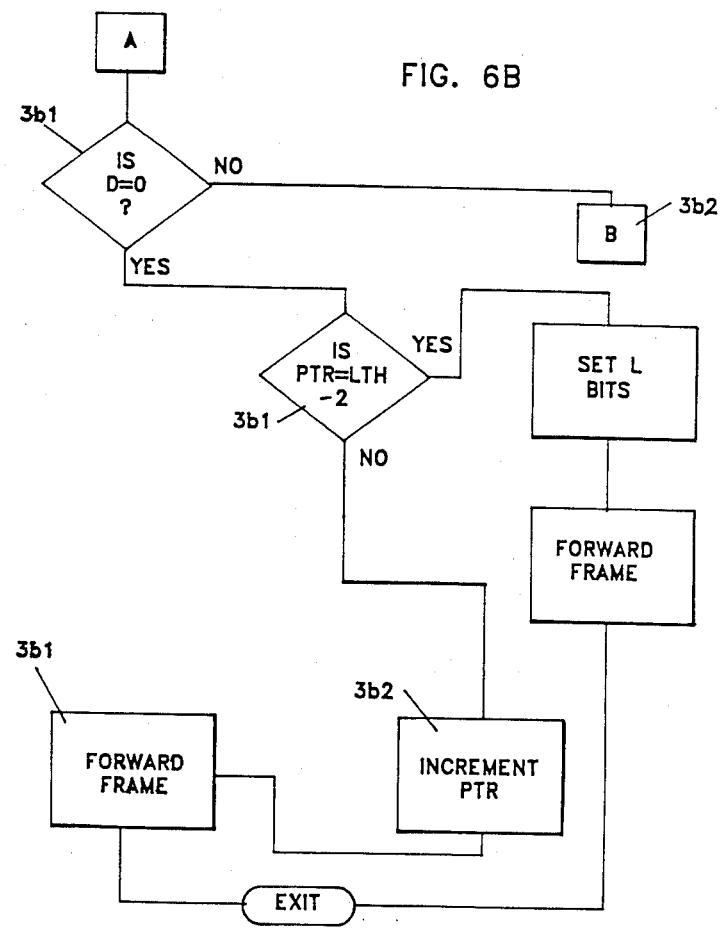
Figure 6C:
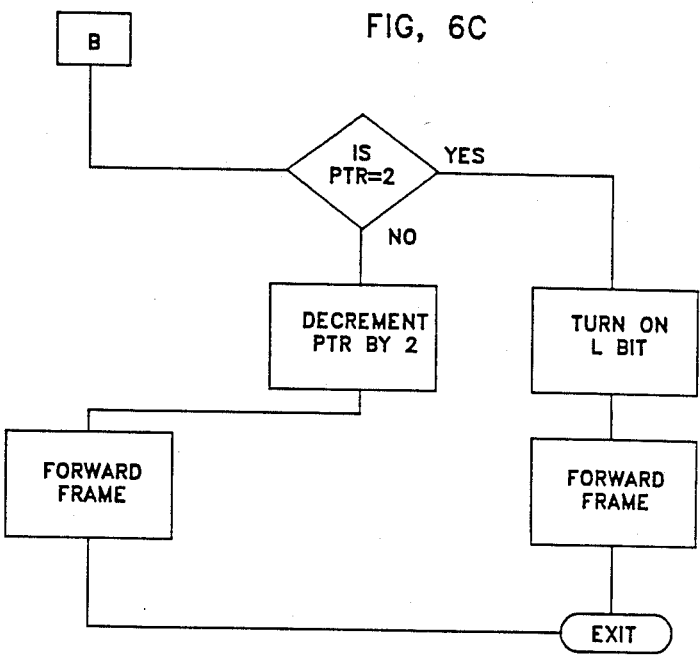

FIGS. 6A–6C show more detailed flow charts of the algorithms which are provided at each bridge to analyze the messages generated in accordance with the above described frame format and to guide the routing of a message through the network. To make the description less cumbersome, common alphanumeric characters are used to identify the below-listed process steps and the blocks in the flow chart that perform each process step. Stated another way, in the text below the alphanumeric characters on the left identify the process steps and the blocks. The description of the process is given relative to each alphanumeric character. In the flow chart the same alphanumeric character is used to identify the process step while the contents of the block is a short description of the function. The program does the following steps:

1. Examine the state of the "U" bit (PCF1 bit 3). If this bit is not on, the frame will not leave its ring and it is discarded.
2. If "U" bit is on, then examine the broadcast indicator. If this bit is on, the frame is destined to all rings and the following actions should be taken:
   a. Examine if the limited broadcast (LB) bit is on. If the bit is on and the bridge is configured not to accept any limited broadcast frames (LB Fr) the frame is discarded.
   b. Compare the (PTR) with the Hop-count. As stated previously, a set of Hop-count is given to a bridge during its initialization, one for each attached ring. Its purpose is to prevent the broadcast frame from circulating indefinitely. When the bridge sees a broadcast frame, it will compare the pointer that is in the RI field with Hop-count assigned. If the value of (PTR-2/2) is less than the Hop-count, the frame is transmitted forward. Otherwise, the frame will be discarded. The value of (PTR-2/2) is selected because the (R1) field contains 2 (two) bytes and each Bridge Number (BN) is 2 bytes long;
   c. Examine if the Bridge Group (BG) portion of bridge number has appeared in the RI field. If so, this indicates that the frame has returned to the source ring and has to be discarded.
   d. Insert the bridge number into the frame at the location indicated by the pointer or the length (LTH) value. As indicated before, the PTR value may be (PTR+2). Similarly, the LTH value is (LTH−2).
   e. Increment the length by 2.
   f. Forward the frame. This includes the generation of new FCS, S-DEL, PCF-1, E-DEL and PCFE) fields.
3. If the "U" bit is on, but the broadcast indicate is not on, then compare the (BN) in the (RI) field (as indicated by the pointer) with the assigned bridge number (BN assigned). If they do not match, the bridge will not forward the frame. If they match, then examine the state of "L" bit. If the L bit is "1," the frame will not be forwarded. It is discarded. If "L" bit =0, the following action will be taken:
   a. If LTH=4, only one bridge is specified between the source and the destination. The frame is then forwarded and the program is exited.
   b. If (LTH) does not equal 4, then take the following actions:
1. If D=0 and PTR=(LTH-2), the frame has arrived at the target ring, turn on L bits, forward the frame.

2. If D=0 and PTR is less than (LTH-2), increment pointer and forward frame.

With reference to FIG. 6C, if D=1 and PTR=2, turn on the L bits, forward the frame and exit the routine. If D=1 and the PTR is not equal to 2, decrement the PTR, forward the frame and exit the routine.

In addition to routing messages through a path whose bridge identity is known, the above-described frame can be used to acquire the routing path between two stations. The procedure for acquiring the routing information begins at an originating station such as station A sending out a control frame called a "Resolve" to a target station. The Resolve is the frame in which the above described B bit is set to a logical "1." In addition, the address space for the bridge ID is left blank and the length field is set to a 2. As the frame travels through the network, it acquires information describing the route it follows. The routing information is in the form of the bridge numbers which are inserted into the variable lengths routing information field by each bridge through which the frame passes. As a bridge inserts its ID number, the value of the length field is incremented to identify the next boundary in which a bridge will insert its own ID. If there are multiple routes between the originating and target stations, multiple resolves are created from a single transmission and reach the target station. Each one will have a different series of bridge numbers in the RI field.

When the target station receives a Resolve, it sends a "Resolve Response" frame back to the target station. In order to send the Resolve Response back, the target station changes the B bit to "0" and sets the pointer field to a value of LTH-2. Also, the B bit is complemented signifying that the response frame is no longer a broadcast frame. The path traced by the Resolve Response message is similar to the path followed by the Resolve message. The only difference is that the bridges are now accessed in the reverse direction or order. When the first resolve response message is received at the originating station, the station extracts the routing information from it and saves it for use with subsequent transmission to the target station.

FIG. 7 shows a network topography in which loop A and loop B are interconnected by multi-paths (P₁, P₂, P₃ and P₄). Each of the paths comprises of multiple bridges B and multiple loops. The bridges (B) which are represented in broken lines are programmed not to forward limited broadcast frames. The bridges (B) which are shown in a solid line are programmed to forward limited broadcast frames.

The programming of the bridges can be done at bridge initialization time. Although a plurality of techniques may be used to program the bridge in the preferred embodiment, a "Flag Bit" is set at a predetermined storage location. The program which analyzes the frame accesses the storage location and if the bit is set, the bridge will not pass limited broadcast frames.

In operation, a station (S1) (FIG. 7) wishing to communicate with (S2) generates and forwards a "Resolve" frame in which the B and LB bits are both set to a logical "1." The bridges B which are shown by broken lines are configured not to forward LB (limited broadcast) frames. Therefore, only the bridges shown in a solid line will forward the LB frame. As a result only one copy of the Resolve frame is delivered to station (S2) via the bridges shown in solid lines. It should be noted that if B is set to logical "0" the algorithm ignores the setting of the LB bit. Likewise, if B=1 and LB=0, the frame is processed as a general broadcast.

Several benefits inure to the user of the above described architecture. Among the benefits are:

Single path routing for each frame. A non-broadcast frame should traverse only the rings necessary to travel from its source to its destination. The frame should not appear on other rings because it would consume their bandwidth unnecessarily and contribute to their congestion.

Consistency with the token ring architecture is provided. Since a bridge is a device that attaches to a ring, preferably it should adhere in its attachment to each ring to the formats and protocols defined in the above-cited IEEE 802.5 standard. Protocols above medium access layer (FIG. 2) are not affected. The bridge must remain independent of higher level protocols in order for the network of interconnected token rings, like the single ring, to support the logical ring control and higher level protocols of the variety of attached stations.

Independence of location, topology, protocol: The communication protocol between the stations should be independent of there being in the same ring or in different interconnected rings and should be independent of the topology of rings or bridges. Thus, prior knowledge of the physical configuration is not imposed on the attached stations.

The architecture offers dynamic connectivity. The ease of moving a station from one attached point to another while retaining its communication ability is not diminished when the attachment points are in different rings.

The architecture offers reliability and affordability. The architecture for ring interconnection allows the existence of multiple active routes and maintains the same level of end-to-end data integrity as if the stations were in a single ring environment.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a telecommunication network system wherein a plurality of serial loop networks are being interconnected by a plurality of bridges and each serial loop having one or more utilization stations connected thereto a method for routing frames between stations comprising the steps of:
(a) transmitting from a source station through the loop connected to it, a frame including a first indicia having at least two states and Routing Information (RI) field;
said RI field including one or more routing addresses adaptable for identifying the bridges through which the frame is being routed, a pointer (PTR) field for identifying the order in which the bridges will process the frame and a Length (LTH) field for indicating the length of the RI field;
(b) receiving the frame at a bridge;
(c) determining the position of the bridge relative to the order in which the bridges process the frame;
(d) incrementing the value of the pointer field only if the frame is accessing the bridges in an ascending order;

(e) decrementing the value of the pointer field only if the frame is accessing the bridges in a descending order; and (f) retransmitting at the next opportunity given to the bridges by the network the frame including the adjusted pointer field whereby the steps recited in (b)–(f) above are being repeated at the bridges whose identify appears in the RI field until the last bridge in said field receives the frame with the pointer being set to a predetermined value, thus indicating that said bridge is at a target ring.

2. The method recited in claim 1 further including the step of forwarding the frame to the target ring from whence it is being removed by a target station.

3. The method recited in claim 1 wherein the RI field further includes a second indicia having at least two states.

4. The method recited in claim 3 further including the steps of:

(g) receiving the frame at a target station;

(h) examining the second indicia for determining the state of said second indicia;

(j) complementing the second indicia so that said indicia is being set to the opposite state; and (k) setting the PTR to a different value, said value indicating the identity of the first bridge through which the frame is being routed, thereby allowing a common frame to shuttle messages throughout the network without rearranging the relative order of the bridges in the RI field.

5. The method of claim 4 wherein step (j) further including the steps of:

(i) comparing the identification number of the bridge with the number identified by the pointer;

(ii) examining the second indicia only if the bridge number matches the number in the RI field;

(iii) comparing the value in the PTR field with a range of predetermined values; and (iv) characterizing the bridge as being on the ring with the initiating station only if the value in the PTR field is equivalent to one of the predetermined values.

6. In a telecommunication network system wherein a plurality of serial loop networks are being interconnected by a plurality of bridges and each serial loop having one or more utilization stations connected thereto a method for routing frames between stations comprising the steps of:

(a) transmitting from a source station through the loop connected to it, a frame including a first indicia having at least two states and a Routing Information (RI) field;

said RI field including one or more routing addresses adaptable for identifying the bridges through which the frame is being routed, a point (PTR) field for identifying the next bridge to process the frame and a Length (LTH) field for indicating the length of the RI field;

(b) receiving the frame at a bridge connected to the loop; and examining the first indicia for determining the state of said first indicia;

(c) determining the position of the bridge relative to the route;

(d) incrementing the value of the pointer field only if the frame is accessing the bridges in an ascending order;

(e) decrementing the value of the pointer field only if the frame is accessing the bridges in the opposite order; and (f) retransmitting at the next opportunity given to the bridges by the network the frame including the adjusted pointer field whereby the steps recited in (c)–(f) above are being repeated successively at the bridges whose identify appears in the RI field until the last bridge in said field receives the frame with the pointer being set to a predetermined value, thus indicating that said bridge is at a target ring.

7. The method recited in claim 6 wherein steps (c)–(f) are being performed only if the first indicia is set to a first state.

8. A method for routing information through a network having a plurality of independently interconnected rings comprising the steps of:

(a) transmitting from a source station a frame having a first indicia set to a first state, a second indicia having at least two states and a Routing Information (RI) field;

said RI field further characterized by an LTH field for containing data representative of the size of the RI field, a PTR field, at least one two-state indicia and an address space for carrying the addresses of switching stations;

(b) receiving the frame at a switching station and examining the first indicia for determining the state of said first indicia;

(c) analyzing the RI field only if the first indicia is set to the first state;

(d) incrementing the value of the PTR only if the two state indicia of the RI field is being set to a predetermined value and the PTR is being set to a first predetermined value;

(e) retransmitting the frame;

(f) receiving the frame at a switching station identified by the PTR value;

(g) incrementing the PTR value only if the PTR is being set to a second predetermined value;

(h) retransmitting the frame and repeating steps (f)–(h) successively at the switching stations whose address appears in the address space until the last switching station identified in said address space receives the frame with the PTR value being set to a third predetermined value, thus indicating that said frame has arrived at the target ring.

9. The method recited in claim 8 further including the steps of:

(i) receiving the frame at a target station; and (j) resetting the received two state indicia in the RI field to its opposite state and resetting the PTR to a different value thereby forming an adjusted frame for carrying information without changing the order of the switching stations within the address space.

10. The method recited in claim 7 further including the step of setting the second indicia at one of the switching stations.

11. The method of claim 9 further including the steps of:

(k) transmitting the adjusted frame in step (j);

(l) receiving the adjusted frame at a switching station identified by the PTR value;

(m) decrementing the PTR value only if the two state indicia is being set to a predetermined state and the PTR is being set to a fourth predetermined value;

(n) retransmitting the adjusted frame;

(o) receiving the adjusted frame at a switching station identified by the PTR value;

(p) decrementing the PTR value only if the receive PTR value is being set to a fifth predetermined value; and (q) retransmitting the frame and repeating steps (e)–(g) successively at the switching stations whose address appears in the address space until the last switching station identified in said address receives the frame.

12. In a telecommunication network system wherein a plurality of serial loop networks are being interconnected by a plurality of switching stations and each serial loop having one or more utilization stations connected thereto a method for routing frames between stations comprising the steps of:

(a) generating and transmitting from a source station a frame having at least a Routing Information field; said Routing Information field including an LTH field, an indicia having at least two states, a PTR field and an address space having one or more switching station addresses;

(b) receiving the frame at the switching station identified by the PTR;

(c) adjusting the value of the PTR only if the indicia is in a first state and the PTR is being set to a first predetermined value;

(d) retransmitting the frame;

(e) receiving the frame at a switching station identified by the PTR;

(f) adjusting the value of the PTR only if the PTR is being set to a second predetermined value;

(g) retransmitting the frame and repeating steps (e)–(g) successively at the switching stations whose addresses appear in the address space until the last identified switching station receives the frame.

13. In a telecommunication network system wherein a plurality of serial loop networks are being interconnected by a plurality of switching stations and each serial loop having one or more stations thereon, a method for obtaining the addresses of the switching stations through which a message is to be routed comprising the steps of:

(a) generating and transmitting from a source station a frame including the address of a destination station and an RI field, said RI field having at least a two-state indicia set to a first state, an LTH field set to a predetermined value;

(b) receiving the frame at a switching station;

(c) writing the address of the switching station in the frame at a location identified by the LTH field only if the value of the LTH field is less than a Hop-count or the address of the switching station is not recorded in the frame;

(d) adjusting the LTH field value;

(e) retransmitting the frame; and (f) repeating steps (b)–(f) until the frame is received at the destination station.

14. The method recited in claim 13 further including the steps of:

(g) resetting the two state indicia in the receive frame to the opposite state;

(h) setting predetermined values in the LTH field and a PTR field; and (i) utilizing the accumulated addresses as the routing Path for subsequent exchange of messages between the stations.

15. The method of claim 13 wherein step (d) is being Performed by incrementing the value of the LTH field.

16. In a telecommunication network system wherein a plurality of serial loop networks are being interconnected by a plurality of switching stations and each serial loop having one or more stations thereon a method for using a single copy of a message to identify the routing path for a selected station comprising the steps of:

(a) generating and forwarding from a source station a frame including the selected station address, a source address and an RI field; said RI field including two two-state control indicia, each being set to a common predetermined value;

(b) receiving the frame at a switching station;

(c) examining the RI field to determine the state of the two indicia;

(d) writing the identification number of the switching station in the location identified by an LTH field only if the two indicia are being set to a common predetermined value;

(e) adjusting the length (LTH) field value;

(f) forwarding the frame; and (g) repeating steps b–g until the value of the LTH field exceeds a Hop-count setting of a switching station or the address of the station is already recorded in the RI field.

17. In a digital communication network wherein a plurality of data terminal equipment (DTE) are coupled to a serial transmission path means and a plurality of the serial transmission path means are interconnected by one or more switching stations, a message transport mechanism for carrying messages within the network comprising:

a frame code signal generating means disposed within the DTE and adapted to generate the message transport mechanism;

said message transport mechanism having at least a Routing Information (RI) field divided into a control (C) section adapted for carrying control information and a routing section adapted for carrying the identity of the switching stations through which the message is to be routed;

a first two-state indicia disposed outside of the RI field and operable for indicating the presence of the RI field when it is set in a predetermined state; and a second set of two-state indicia disposed outside of the RI field and operable for indicating that the message has passed through the last switching station when it is set in a predetermined state.

18. The message transport mechanism of claim 17 wherein the control (C) section includes a third two-state indicia operable to indicate the type of message; a fourth set of indicia operable to carry a value representing the length of the RI field; a fifth two-state indicia operable to indicate the direction in which a message moves relative to initiating a DTE and a sixth set of bits operable to identify the next switching station which will process said message.

19. The message transport mechanism of claim 18 further including means disposed at the switching station and operable to analyze the contents of the message transport and to route the message according to the setting of the indicia.

20. In a communications network system wherein a plurality of serial loop networks are being coupled by a plurality of switching stations and each serial loop network having one or more utilization stations connected thereto a method for routing frames between stations connected to different loop networks comprising the steps of:

(a) transmitting from a source station through the loop connected to said source station a frame including a Routing Information (RI) field;

said RI field including one or more routing addresses operable for identifying the switching stations through which the frame is being routed, a pointer (PTR) field operable for identifying the switching station that will next forward the frame and a first indicium having at least two states;

(b) receiving the frame at a switching station;

(c) examining the first indicium;

(d) incrementing the pointer field only if the first indicium is being set to a first predetermined state;

(e) decrementing the pointer field only if the first indicia is being set to a second predetermined state; and (f) retransmitting at the next opportunity given to the switching station by the network the frame including an adjusted pointer field whereby steps (b)-(d) are being repeated by each of the switching stations having addresses within the RI field until the last switching station in said RI field receives the frame thereby indicating that said frame is at a target loop network.

* * * * *